United States Patent Office 3,513,047
Patented May 19, 1970

---

3,513,047
PROCESS FOR PRODUCING CUSHIONLESS RETREADED TIRES
Frederick D. Campbell, Harbor City, and Robert L. Torian, South San Gabriel, Calif., assignors to Tread Rubber Corporation, Los Angeles, Calif., a corporation of California
No Drawing. Continuation-in-part of application Ser. No. 502,562, Oct. 22, 1965. This application Sept. 26, 1968, Ser. No. 763,016
Int. Cl. B29h 5/04, 17/02
U.S. Cl. 156—96                    1 Claim

ABSTRACT OF THE DISCLOSURE

The invention is a tire retreading process in which uncured tread rubber is applied to the periphery of the tire carcass by an adhesive solution comprising rubber, zinc oxide, stearic acid, mercaptobenzothiazole and phenylbeta napthyl amine, together with an accelerator or accelerator activator, and finally vulcanizing the assemblage.

---

This application is a continuation-in-part of application Ser. No. 502,562, filed Oct. 22, 1965, now abandoned.

This invention relates to a method of retreading worn rubber tires and to the adhesives employed in uniting tread rubber to the tire carcass.

The primary object of the invention is to provide a method whereby tires may be retreaded without interposing a rubber cushion between the tire carcass and the tread rubber applied thereto and yet produce a stronger and more durable and effective bond between the tread rubber and tire carcass than is attained by retreading methods now generally in use.

Heretofore it has been the common and usual practice in retreading tires to apply to the side of the tread rubber that abuts the tire carcass a layer of natural rubber having a thickness of approximately one-thirty second of an inch, which layer, when the tread rubber is applied, constitutes a cushion between the tread rubber and tire carcass the main function of which is to adhere the new tread to the tire carcass until the tire is inserted in a mold wherein the tread stock and cushion are vulcanized whereupon the cushion forms a bond between the new tread and tire.

It has been found that migration of oil from either or both the carcass and tread rubber into the cushion has a softening effect thereon resulting in possible tire failure.

The present invention is concerned with the materials and techniques by which it is possible to manufacture practical and highly efficient cushionless retreaded tires.

In carrying out the invention two independent adhesives are employed, one of which is applied to the inner side of the tread rubber layer, and the other of which is applied to the buffed tire carcass, which adhesives have been specially compounded and are applied in a particular manner to co-act with each other when applied and vulcanized to effect a highly effective and greatly improved bond between the new tread and the tire carcass.

Each of the two adhesives is based on natural rubber, dissolved in a suitable adhesive solvent in a conventional fashion after reduction or elimination of "breakdown" or plastication of the rubber in a usual manner; 75% of the rubber being unplasticized.

The solvent used may consist of mixed hexanes or mixture of hexanes and toluene which latter facilitates solution of the rubber, but is not essential.

In order to obtain adequate vulcanizing properties in the adhesives, vulcanizing agents and age resistors are added to and thoroughly intermixed with the dissolved natural rubber in a concentrated master batch form, as follows:

Vulcanization agents:

| Material— | Parts per C of Natural rubber |
|---|---|
| Zinc oxide | 1–20 |
| Stearic acid | 0–4.0 |
| Mercaptobenzothiozole | 0–4–1.0 |

Age Resistor—
    Phenylbeta naphthyl amine _____ 0.5–2.0

The above mixture may be made with or without addition of sulfur, but which is preferably omitted in the interest of maximum shelf life, sulfur not being essential as an ingredient of the adhesive since the sulfur necessary to vulcanization (2–5 parts) is subsequently supplied in the adhesive polymer by migration of the adjacent tread rubber containing same to which the adhesive is applied.

Various pigments and plasticizers may be added to the above recited mixture of ingredients and considerable variation of the constituents and their proportions is possible without disturbing the essential properties of the adhesives.

The necessary feature of these accelerators and accelerator activators is that they are migratory. By migratory is meant that the ingredient is capable of moving from the applied adhesive into the adjacent rubber in sufficient quantity to materially effect the vulcanization characteristics of the adjacent rubber which contains a rubber accelerator as is common practice.

The adhesive applied to the carcass is essentially the same as that used on the tread rubber as above described with the exception that a higher than normal concentration of an accelerator or an accelerator activator is added.

The accelerator consists of a material selected from a group consisting of:

Acetaldehyde/butydraldehyde/aniline reaction products,
Butydraldehyde/monobutyl/amine reaction products,
Heptaldehyde/aniline reaction product,
Butyraldehyde/aniline reaction product,
Alpha-ethyl-beta-propyl acrolein/aniline reaction product,
Trialky thioureas,
Dithiocarbamates, and
Dibutyl Xanthogen disulfide.

The accelerator activator consists of either:

Dibenzylamine and
Butyl ammonium oleate.

The mode of application of the tread rubber to the tire carcass consists in producing a strip of uncured tread rubber in the usual manner, which strip has an outer side of any desired tread contour and has an inner side conformable to the periphery of a tire carcass to be retreaded. A coating of the first above described adhesive is applied to the inner side of the strip of tread rubber. On such application of the adhesive the tread rubber is aged for a period of twelve (12) hours or more after which the adhesive coated tread rubber is applied to the tire carcass.

In the meantime the surface of the periphery of the tire carcass is buffed and conditioned for the reception of the new tread in a usual manner and one or more coats of the second above described adhesive is applied to the buffed surface. On then applying the previously coated tread rubber to the adhesive coated surface of the carcass, substantial initial cohesion of the two adhesive coatings will take place thereby firmly uniting the tread rubber to the tire carcass such as to obviate displacement of the tread during the succeeding operations of placing the assemblage in a mold and subjecting it to the heat and pressure of the usual vulcanizing action in completing the retreading operation which is accomplished in the usual manner.

It is our experience that in spray application of the adhesive on the carcass, accelerator or accelerator activator concentrations in the range of 0.2% by volume of the adhesive solution are effective in producing an obviously improved bond between the tread rubber and the carcass.

These accelerator or accelerator activator concentrations are 10 to 30 times as great as would be required for vulcanizing the rubber in the adhesive. The amount of rubber in the adhesive solution may be varied to fit the application equipment. In actual practice, 2 to 5% solids have been used.

Depending upon the strength of the rest of the tire, the force necessary to separate the tread from the carcass has been measured at over 100 lbs. for an inch wide sample as contrasted with 60-80 lbs. pull, which is typical of a conventional retread with a cushion between the carcass and the tread. The superior adhesion persists after thousands of miles of service, thus making for a more trouble free product.

We claim:

1. The method of retreading the carcass of a rubber tire consisting in providing a strip of uncured tread rubber conformable to the periphery of a tire carcass, applying to the inner side of the body of tread rubber a coating of an adhesive solution comprising dissolved natural rubber 75% unplasticized, zinc oxide, stearic acid, mercaptobenzothiazole and phenylbeta naphthyl amine, ageing the adhesive coated tread rubber strip for a period of twelve hours or more, applying to the periphery of the tire carcass an adhesive coating comprising the above recited ingredients together with an accelerator which consists of a material selected from a group consisting of:

Acetaldehyde/butydraldehyde/aniline reaction product,
Butydraldehyde/monobutyl/amine reaction product,
Heptaldehyde/aniline reaction product,
Butyraldehyde/aniline reaction product,
Alpha-ethyl-beta-propyl acrolein/aniline reaction product,
Trialky thioureas,
Dithiocarbamates, and
Dibutyl Xanthogen disulfide.

Or including an accelerator activator consisting of either

Dibenzylamine and
Butyl ammonium oleate, wherein said accelerator or accelerator activator concentrations are in the range of 0.2% to 2.0% by volume of the adhesive solution applying the aged adhesive coated tread rubber to the adhesive coated perimeter of the tire carcass with the adhesive coated surfaces thereof abutting, whereby said adhesive coating cohere, and finally vulcanizing the assemblage.

References Cited
UNITED STATES PATENTS

| | | | |
|---|---|---|---|
| 2,488,112 | 11/1949 | Baldwin | 264—28 |
| 2,489,340 | 11/1949 | Sturgis et al. | 260—79.5 |
| 2,561,524 | 7/1951 | Massie | 260—782 |
| 2,640,088 | 5/1953 | Glenn et al. | 260—779 X |
| 2,758,037 | 8/1956 | Cahill | 156—96 X |
| 2,909,584 | 10/1959 | Parks | 260—785 |
| 3,037,900 | 6/1962 | Hings et al. | 156—310 |
| 3,198,679 | 8/1965 | Iknayan et al. | 156—96 |
| 3,198,680 | 8/1965 | Iknayan | 156—96 |
| 3,349,094 | 10/1967 | Bromby et al. | 260—779 X |

LELAND A. SEBASTIAN, Primary Examiner

U.S. Cl. X.R.

156—128, 338; 161—188